United States Patent [19]

Parekh et al.

[11] Patent Number: 4,631,320
[45] Date of Patent: Dec. 23, 1986

[54] COATING COMPOSITIONS CONTAINING POLYURETHANE OR POLYUREA POLYMERS AND AMINO RESINS

[75] Inventors: Girish G. Parekh, Fairfield; Werner J. Blank, Wilton, both of Conn.

[73] Assignee: American Cyanamid Company, Stamford, Conn.

[21] Appl. No.: 581,015

[22] Filed: Feb. 17, 1984

[51] Int. Cl.$^4$ .................... C08F 283/04; C08G 2/00; C08G 12/02
[52] U.S. Cl. .................... 525/452; 525/456; 427/372.2; 528/253; 528/256; 528/258; 528/262; 528/369
[58] Field of Search ............... 525/452, 456; 528/253, 528/258, 262, 369, 256; 427/372 Z; 564/133

[56] References Cited
U.S. PATENT DOCUMENTS

| | | | |
|---|---|---|---|
| 4,017,456 | 4/1977 | Tucker et al. | 525/456 |
| 4,017,556 | 4/1977 | Wang | 525/456 |
| 4,190,715 | 2/1980 | Isaksen et al. | 528/256 |
| 4,214,073 | 7/1980 | Passagne et al. | 528/369 |
| 4,404,332 | 9/1983 | Parekh et al. | 525/428 |
| 4,435,559 | 3/1984 | Valko | 528/73 |

OTHER PUBLICATIONS

Y. Miyake et al., "New Method for Preparing Saturated and Unsaturated Aliphatic Polyurethanes", *The Journal of Polymer Science*, vol. 7, pp. 899–916 (1969).
R. Cowell, "Thermoplastic Polyurethane Elastomers: Chemistry Properties and Processing for the 80's", Journal of Elastomers and Plastics, vol. 14 (1982) pp. 195–203.
Najer et al. (Comp. rend. 1142, 1954).

*Primary Examiner*—John Kight
*Assistant Examiner*—Kriellion Morgan
*Attorney, Agent, or Firm*—John W. Cornell

[57] ABSTRACT

A thermosettable coating composition comprises a hydroxy group-containing polyurethane, polyurea or polyurethane/polyurea polymer, an amino cross-linker and optionally, a catalyst and/or solvent. The polymer is obtained by self condensation of an hydroxyalkyl carbamate compound or condensation of such compound with a polyol and/or a polyamine. An applied coating of the composition is cured by heating to an elevated temperature, e.g., from about 200° to about 400° F. (about 93° to 204° C.).

17 Claims, No Drawings

COATING COMPOSITIONS CONTAINING POLYURETHANE OR POLYUREA POLYMERS AND AMINO RESINS

BACKGROUND OF THE INVENTION

The present invention concerns coating compositions including polyurethane or polyurea polymers and one or more amino resins.

The reaction of propylene carbonate with primary and secondary amines to produce corresponding 2-hydroxypropyl carbamates is known in the art (*Comp. rend*, 1142, 1954). Thus, the prior art shows an awareness that amines react with, e.g., propylene carbonate, to yield the corresponding hydroxyalkyl carbamates. Similar reactions of ethylene carbonate are exemplified by the article, "The Preparation of Polymeric and Cyclic Urethans and Ureas from Ethylene Carbonate and Amines" by Elizabeth Dyer and Harvey Scott, *J.A.C.S.* (1956) pp. 672–675. The Dyer-Scott reference discloses that polyurethanes might be prepared from 2-(hydroxyethyl) carbamate by elimination of ethylene glycol, thereby avoiding the need for using diisocyanates. See also the report "Polyurethane elastomers obtained without the use of diisocyanates" by L. Ya. Rappoport, G. N. Petrov, I. I. Trostyanskaya and O. P. Gavrilova in *International Polymer Science and Technology*, 8, No. 1, 1981. The Rappoport et al paper discloses generally the reaction of cyclic carbonates with amines to form polyurethane elastomers. The *Journal of Polymer Science*, Vol. 7, 899 916 (1969), in an article entitled "*New Method for Preparing Saturated and Unsaturated Aliphatic Polyurethanes*" by Y. Mizake, S. Ozaki and Y. Hirata, at pages 899–915 ,discloses alternate routes to saturated and unsaturated polyurethanes, including polycondensation reaction of glycol bis(chloroformate) with diamine.

An article by Richard D. Cowell entitled: "Thermoplastic Polyurethane Elastomers: Chemistry Properties and Processing for the 80's" in the *Journal of Elastomers and Plastics*, Vol. 14, (October, 1982) pages 195–203, discloses the preparation of bis(2-hydroxyethyl) carbamates by reaction of diamines with ethylene carbonate followed by a catalyzed transesterification reaction with a glycol or macroglycol.

SUMMARY OF THE INVENTION

The present invention provides for a composition well suited to be applied to a substrate and heated to form a thermoset coating. More particularly, the present invention concerns coating compositions comprising hydroxy group-containing polyurethane or polyurea compounds and an amino cross-linking agent.

In accordance with one aspect of the invention, there is provided a thermosettable coating composition comprising: (a) a polymer selected from the class consisting of one or more of hydroxy group-containing polyurethane and hydroxy group-containing polyurea polymers; (b) an amino cross-linker; and (c) optionally, an acid catalyst and (d) optionally, a solvent. The polymer (a) is the reaction product of one or more reaction routes selected from the class consisting of (i) self-condensation of a poly-hydroxyalkyl carbamate compound, (ii) condensation of a poly-hydroxyalkyl carbamate compound with a polyol, and (iii) condensation of a poly-hydroxyalkyl carbamate compound with a polyamine.

In one aspect of the invention, the polymer (a) contains an average of at least 2 functional groups per molecule.

In another aspect of the invention, the amino cross-linker (b) is selected from the class consisting of one or more of ureaformaldehyde, melamine formaldehyde, glycoluril-formaldehyde and benzoguanamine formaldehyde resins which have been at least partially alkylated and at least partially methyloylated.

In other aspects of the invention, the composition may include one or both of the acid catalyst (c) and the solvent (d). The acid catalyst may comprise one or more of blocked or unblocked Lewis or Bronsted acids.

Other aspects of the invention provide for the polyhydroxyalkyl carbamate compound to be a compound of any of the formulas set forth in the detailed description of the invention.

In accordance with yet another aspect of the invention, there is provided a method of forming a coating on a substrate comprising applying to the substrate a coating composition comprising; compounds of (a), (b) and, optionally, (c) and, optionally, (d) as described above, and heating the applied composition at an elevated temperature for a time sufficient to cure it; for example, heating the applied composition at a temperature of from about 200° to about 400° F. (about 93° to 204° C.).

DETAILED DESCRIPTION OF THE PREFERRED EMBODIMENTS

The compositions of the present invention comprise a polymer, derived from a poly-hydroxyalkyl carbamate compound, and an amino cross-linking agent, as well as an optional acid catalyst and solvent. The compositions are well suited to be applied to a workpiece or substrate by conventional techniques such as brush, spray, roller or dipping applications. The applied coating may then be heated to an elevated temperature for a time sufficient to cure it by a cross-linking reaction between the polymer and the cross-linking agent component(s) of the composition.

The Poly-Hydroxyalkyl Carbamate Compound

Cyclic carbonates such as ethylene or propylene carbonate react with polyamines to form poly-hydroxyalkyl carbamates, according to the following typical example in which $R_a$ is assumed to be hydrogen:

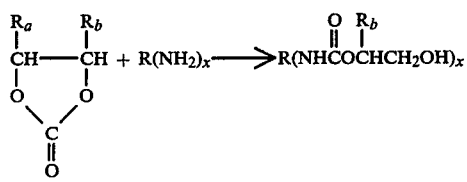

where $R_b$ is hydrogen for ethylene carbonate and methyl for propylene carbonate. The reaction may be run with or without solvent and, if so desired, protic solvents such as water or alcohols may be used. When the polyamine is a primary amine as illustrated in equation (1), the reaction takes place at room or slightly elevated temperatures whereas secondary or hindered primary amines usually require heating and/or the use of catalysts for significant reaction.

The compounds useful in the present invention are polyhydroxyalkyl carbamate compounds. As used herein and in the claims a "poly-hydroxyalkyl carbamate" compound includes di-hydroxyalkyl carbamate compounds, i.e., suitable compounds containing two or more hydroxyalkyl carbamate groups. Similiarly, as used herein and in the claims, the term "polyamine" means a compound containing two or more amine groups. The poly-hydroxyalkyl carbamate compounds may be obtained by reaction of a cyclic carbonate with a polyamine to obtain a poly-hydroxyalkyl carbamate compound, which may be represented by the formula

wherein R' and R" are any suitable organic moieties. One suitable class of poly-hydroxyalkyl carbamate compound may be represented by the formula

wherein each R is independently H, a $C_1$ or $C_2$ aliphatic alkyl moiety, and $R_1$ is independently a $C_2$ to $C_{12}$ alkyl moiety optionally containing one or more of NH or ether groups, or a $C_6$ to $C_{15}$ cycloaliphatic moiety.

The polyamine utilized in accordance with the present invention to react with one or more cyclic carbonates to provide poly-hydroxyalkyl carbamate-containing compounds may be any one of a large number of compounds and, generally, may comprise any suitable aromatic or aliphatic polyamines including, by way of example and not limitation, $C_2$ to $C_6$ aliphatic diamines, polyethylene amines, and polymers containing pendant primary and/or secondary amine groups.

Generally, the cyclic carbonates which are to be reacted with the amines may comprise any suitable cyclic carbonate which is reactive with amine groups of the polyamine. Generally, five-member ring organic carbonates are preferred as compared to six-member ring organic carbonates because the latter are relatively more expensive and difficult to prepare. Accordingly, a preferred cyclic carbonate utilizable in the present invention has the formula given for the first member in equation (1) above, and wherein $R_a$ and $R_b$ may be the same or different, and each may comprise H, or $CH_3$. Ethylene carbonate and propylene carbonate are readily commercially available and are preferred reactants.

Preparation of the Hydroxy Group-Containing Polyurethane and Polyurea Polymers

The hydroxy group-containing polyurethane polymers may be prepared either by self-condensing the poly-hydroxyalkyl compound or by condensing it with a polyol. The polyol employed in the latter condensation reaction may be any suitable polyol and may be derived from polyols, polyether polyols, polyester polyols, alkyd polyols, phenol formaldehyde condensation products, bisphenol-A, bisphenol-F, polyether resins, bisphenol ethylene oxide or propylene oxide condensation products, polyether resins, dihydroxy polybutadiene, or the like.

Typical polyether diols or polyols which are suitable for use in the present invention are polyethers derived from the reaction of diols, polyols or amines with ethylene oxide, propylene oxide, styrene oxide or the like, or mixtures of other epoxies with a carbon content from $C_2$ to about $C_{18}$ or polyethers derived from tetrahydrofuran.

Typical polyester diols or polyols which are suitable for use in the present invention can be prepared by known methods of condensing diol, triols or polyols with a combination of mono-, di-, tri-, or polybasic carboxylic acids. Typical diols or polyols are ethylene glycol, propylene glycol, diethylene glycol, dipropylene glycol, 1,3 butane diol, 1,6-hexanediol, neopentyl glycol, cyclohexanedimethanol, trimethyl pentane diol, trimethylol propane, pentaerythritol, etc. Typical carboxylic acids are $C_8$ to $C_{18}$ fatty acids, dimeric fatty acids, $C_7$ to $C_{10}$ aliphatic dibasic acids, aromatic mono carboxylic and polycarboxylic acid such as benzoic, phthalic and trimellitic acid.

Polyols or a combination of polyols with an average functionality of 2 to 3 are preferred. Although higher functional polyols can be reacted with the poly-hydroxyalkyl carbamate compounds, the ratio of polyol to carbamate and the resultant reaction must be controlled to prevent gellation. It will be appreciated that one skilled in the art can readily determine, by conventional techniques, the selection of appropriate reactants and conditions so as to avoid gellation. The condensation of the poly-hydroxyalkyl carbamate compound and a polyol may be represented by the following equation

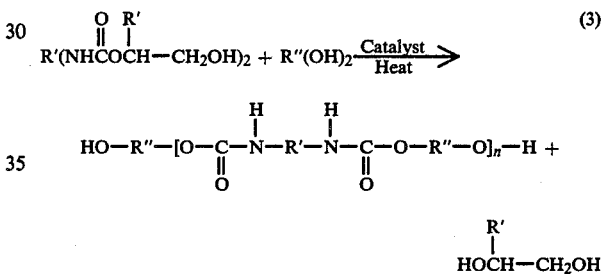

wherein each of R' and R" is the same or different and comprises any suitable organic moieties.

Reaction (3) illustrates the formation of an hydroxy group-terminated polyurethane polymer and a 1, 2-diol leaving group. The reaction of the poly-hydroxyalkyl carbamate and a polyol can proceed solely by heat or in the presence of a suitable transesterification catalyst such as a tin compound. The reaction can also be run in a solvent medium. The diol which is eliminated during the condensation reaction may be continuously removed by distillation, either using the vacuum or azeotropic distillation with a suitable solvent.

An hydroxy group-containing polyurethane polymer having a high urethane content may be obtained by self-condensation of a polyhydroxyalkyl carbamate compound as illustrated by

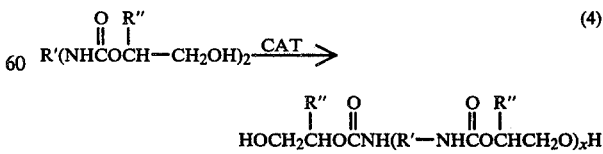

wherein each of R' and R" is the same or different and comprises a suitable organic moiety. The reaction of the poly-hydroxyalkyl carbamate and a polyamine can proceed in the presence of any suitable catalyst. Suitable catalysts include organo tin compounds such as dialkytin compounds, e.g., dibutyltindilaurate, organo zinc compounds such as zinc octoate, zinc butyrate, etc., some organo titanium compounds, and, generally, any suitable catalysts as are known in the art.

The hydroxy group-containing polyurea polymer may be obtained by condensation of the poly-hydroxyalkyl carbamate compound with a suitable polyamine, as illustrated by

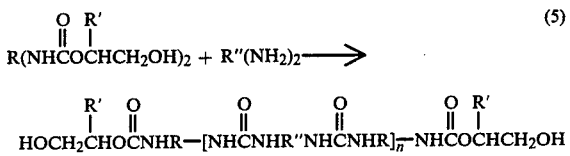

wherein each of R' and R" may be the same or different and comprise any suitable organic moiety.

It should be noted that partial replacement of the polyol with polyamines can be carried out, i.e., a co-condensation of the poly-hydroxyalkyl carbamate compound with one or more polyols and one or more polyamines can be carried out in order to incorporate both urea and urethane linkages in the polymer. For example, the incorporation of urea linkages in the polyurethane polymer is often desired to achieve improved hardness and increased solvent resistance.

While the above-described polyurea and polyurethane polymers may find use as thermoplastics in elastomer applications such as molding compounds, coatings for metals, plastics, textiles or adhesives, it has been recognized that their hydroxy functionality and the urethane linkage or unsaturation on the main chain can be used for further cross-linking. The hydroxy functionality can be cross-linked with amino formaldehyde resins or isocyanates and the unsaturated linkages can be used for air oxidative cure or for sulfur vulcanization. It has been found that a composition well suited to provide a thermosettable coating composition can be prepared by utilizing an amino cross-linker in combination with the polyurethane, polyurea or poly:rethane-polyurea polymer.

The Amino Cross-Linker

The amino cross-linker may be any one of a large variety of known amino cross-linking compounds including cross-linkers based on melamine, guanamines such as benzoguanamine, urea, substituted ureas and the like. As used herein and in the claims, the term "amino cross-linker" is intended to include any suitable amino group-containing compound capable of cross-linking with the polymers employed in the invention, upon heating to a suitable elevated temperature. One such suitable class of materials is aminoplast resinous compositions, in particular, modified aminoplast resinous compositions such as those disclosed in U.S. Pat. No. 3,082,180, comprising modified amino-triazine-aldehyde resins. One suitable class of amino cross-linkers useable in the invention comprises fully methylated, fully methylolated melamine compositions, a process for the manufacture of which is described in U.S. Pat. No. 4,293,692. Another suitable group of amino cross-linkers is that described in U.S. Pat. No. 4,105,708 and comprising substantially fully mixed-alkylated, substantially fully methylolated glycoluril derivative comprising dimethoxymethyl diethoxymethyl glycoluril. Glycoluril is also known as acetylene urea and is obtained by reacting two moles of urea with one of glyoxal. Its proper chemical name is tetrahydroimidazo-(4, 5-d) imidazole 2, 5 (1H, 3H)-dione. The disclosures of the aforesaid U.S. Pat. Nos. 3,082,180; 4,293,692 and 4,105,708 are each incorporated by reference herein.

Particularly suitable classes of amino cross-linkers for use in the present invention are urea-formaldehyde, melamine-formaldehyde, benzoguanamine formaldehyde and glycoluril-formaldehyde resins which, in each case, have been partially or fully, i.e., at least partially, alkylated and methylolated. For example, as disclosed in the aforesaid U.S. Pat. No. 4,293,692, melamine may be methylolated by reaction with formaldehyde, either fully methylolated to produce hexamethylol melamine, or partially methylolated to produce pentamethylol melamine, tetramethylol melamine, etc., or mixtures of two or more of the foregoing. The at least partially methylolated melamine (or glycoluril) may then be reacted with an alcohol, such as methanol, to fully or partially alkylate the fully or partially methylolated melamine or glycoluril. For example, a substantially fully methylolated, fully alkylated melamine (hexamethoxymethylmelamine) is sold under the trademark CYMEL 303 by American Cyanamid Company. Reference herein and in the claims to "melamine formaldehyde and glycoluril formaldehyde resins" includes any suitable melamine containing resin and any suitable glycoluril containing resin utilizeable as a cross-linker in coating compositions.

The Solvent

Any suitable solvent or vehicle may be used to carry the polymer, cross-linker and optional catalyst of the invention such as, for example, ethylene glycol monoethyl ether (Cellosolve).

The Catalyst

The catalyst optionally employed in the composition of the invention may comprise any suitable acid catalyst. Generally, any substance meeting the definition of a Lewis or Bronsted acid and which does not interfere with the cross-linking reaction may be used. Among suitable acid catalysts are aromatic sulfonic acid compounds such as those disclosed in U.S. Pat. No. 3,960,688, alkyl esters of phosphoric or alkyl phosphonic acids, dinonyl naphthalene sulfonic acid, paratoluene sulfonic acid, n-dodecylbenzenesulfonic acid and the like, as well as inorganic acids such as nitric, sulfuric, phosphoric and hydrohalic acids. Phosphoric acid ester catalysts of the type sold under the trademark CYCAT by American Cyanamid Company may suitably be employed.

Other additives, such as pigments, modifiers, etc. may also be included in the composition as is well known in the art.

The efficacy of the present invention is well illustrated by the following illustrative examples of specific embodiments thereof.

EXAMPLE 1

A polyether polyurethane diol is prepared by adding to a suitably equipped flask 32 grams (0.10M) of polytetramethylene glycol (sold under the trademark Teracol 650); 78 grams (0.12M) of hexamethylene bis(hydroxypropyl) carbamate, prepared following a literature procedure (*Bull. Chim. Soc. Fr.* 1142, 1954); and 0.6 grams dibutyltindilaurate. The reaction mixture was heated to 175° C. under reduced pressure.

A distillate carried over under reduced pressure was mainly propylene glycol and a small amount of propylene carbonate. About 12 grams of distillate was collected before terminating the reaction after 2 hours. On cooling, 75 grams of Cellosolve was added to the resulting product which by i.r. showed urethane linkages and very few urea linkages. The final resin solids was 57±2% by weight and the resin displayed a very high viscosity.

EXAMPLE 2

A polyester polyurethane diol was prepared following the procedure of Example 1, except that 53 grams (0.1M) PCP polyol 0200 was used in place of the Teracol 650 polytetramethylene glycol. The i.r. of the product showed the presence of ester and urethane linkages. No urea or amide links were present. The final resinous product was diluted with 25 grams of Cellosolve. The final resin solids and Gardner-Holdt viscosity were 51±2% by weight and A-B, respectively.

The urethane group-containing resins of Examples 1 and 2 were formulated with a methylated melamine-formaldehyde resin in the presence of a phosphoric acid ester based catalyst to prepare coating compositions as set forth in Examples 3-8 below.

|  | Example | | | | | |
|---|---|---|---|---|---|---|
|  | 3 | 4 | 5 | 6 | 7 | 8 |
| Weight Ratio (Solids Basis) of Urethane to Amine Resin | 80/20 | 80/20 | 65/35 | 65/35 | 50/50 | 50/50 |
|  | Parts by Weight | | | | | |
| Polyurethane of Ex. 1 | — | 35.1 | — | 28.5 | — | 21.9 |
| Polyurethane of Ex. 2 | 39.2 | — | 31.9 | — | 24.5 | — |
| Methylated Melamine formaldehyde resin* | 6.3 | 6.3 | 10.9 | 10.9 | 15.6 | 15.6 |
| Catalyst** | 0.13 | 0.13 | 0.13 | 0.13 | 0.13 | 0.13 |
| Cellosolve Acetate | — | 9.6 | — | 10.6 | — | 11.5 |

*Sold under the trademark CYMEL 325 by American Cyanamid Company. Solids content is 85 ± 2% by weight
**Sold under the trademark CYCAT 296-9 by American Cyanamid Company Draw-downs of the above compositions were made on bonderite 100 supports, using a No. 46 wirecater, held-out 10 minutes. The thus applied coatings were cured at 125° C. for 20 minutes. The characteristics of the cured coatings thus obtained are shown in the following Table.

TABLE

|  | Cured Composition of Example: | | | | | |
|---|---|---|---|---|---|---|
|  | 3 | 4 | 5 | 6 | 7 | 8 |
| Film Thickness Mils | 1.0 | 1.0 | 1.0 | 1.0 | 1.0 | 1.1 |
| Knoop Hardness | — | — | 3.0 | 3.6 | 5.5 | 8.2 |
| Pencil Hardness | 4B | 4B | F-H | HB-F | H-2H | 2H-3H |
| Impact in/lbs, direct | — | — | 80 | 100 | 10 | 10 |
| MEK rubs | 120 | 100 | 200+ | 200+ | 200+ | 200+ |

As indicated by the above Table, the formulations containing urethane/amine resins in a weight ratio of 65/35 (Examples 5 and 6) gave optimum film properties after curing for these specific formulations. All the films had good MEK rub resistance and good flexibility.

Generally, reference herein and in the claims to hydroxyalkyl carbamates and compounds containing the same, including structural formulas of the same, is intended to include the various isomeric species thereof, if any.

While the invention has been described in detail with respect to specific preferred embodiments, it will be apparent to one skilled in the art that numerous variations may be made to the described embodiments without departing from the spirit and scope of the invention.

What is claimed is:

1. A thermosettable coating composition comprising:
   (a) a polymer selected from the class consisting of one or more of hydroxy group-containing polyurethane, hydroxy group-containing polyurea and hydroxy group-containing polyurethane/polyurea polymers;
   (b) an amino cross-linker; and
   (c), optionally, an acid catalyst; wherein the polymer (a) is the reaction product of one or more reaction routes selected from the class consisting of (i) self-condensation of a poly-hydroxyalkyl carbamate compound, (ii) condensation of a poly-hydroxyalkyl carbamate compound with a polyol, and (iii) condensation of a poly-hydroxyalkyl carbamate compound with a polyamine.

2. The composition of claim 1 wherein the polymer (a) contains an average of at least 2 functional groups per molecule.

3. The composition of claim 1 wherein the amino crosslinker (b) is selected from the class consisting of one or more of urea-formaldehyde, melamine formaldehyde, glycoluril-formaldehyde and benzoguanamine formaldehyde resins which have been at least partially alkylated and at least partially methylolated.

4. The composition of claim 1 wherein the polymer (a) is obtained by reaction of a poly-hydroxyalkyl carbamate compound having the formula

wherein each R is independently H, a $C_1$ or $C_2$ aliphatic alkyl moiety, and $R_1$ is a $C_2$ to $C_{12}$ alkyl moiety optionally containing one or more ether groups, or a $C_6$ to $C_{15}$ cycloaliphatic, alkyl aromatic or heterocyclic moiety.

5. The composition of claim 4 wherein each R is independently H or $CH_3$ and $R_1$ is a $C_2$ to $C_6$ aliphatic moiety, or a $C_8$ to $C_{15}$ cycloaliphatic moiety.

6. The composition of claim 1 further including (d) a solvent which is compatible with components (a)-(c).

7. The composition of claim 4 wherein the polyhydroxyalkyl carbamate is selected from the class consisting of hexamethylene bis(hydroxypropyl) carbamate and hexamethylene bis(hydroxyethyl) carbamate.

8. The composition of claim 1 wherein the acid catalyst (c) is selected from the class consisting of one or more of blocked or unblocked Lewis or Bronsted acids.

9. A method of forming a coating on a substrate comprising
   (a) applying to the substrate a coating composition comprising:
      (1) a polymer selected from the class consisting of one or more of hydroxy group-containing polyurethane, hydroxy group-containing polyurea and hydroxy group-containing polyurethane/polyurea polymers;
      (2) an amino cross-linker;
      (3) optionally, an acid catalyst; and
      (4) optionally, a solvent; and
   (b) heating the applied composition at an elevated temperature and for a time sufficient to cure it;
   wherein the polymer (1) is the reaction product of one or more reaction routes selected from the class consisting of (i) self-condensation of a poly-hydroxyalkyl carbamate compound, (ii) condensation of a poly-hydroxyalkyl carbamate compound with a polyol, and (iii) condensation of a poly-hydroxyalkyl carbamate compound with a polyamine.

10. The method of claim 9 wherein the polymer (1) contains an average of at least two functional groups per molecule.

11. The method of claim 9 wherein the amino cross-linker is selected from the class consisting of one or more of urea-formaldehyde, melamine-formaldehyde, glycoluril-formaldehyde and benzoguanamine-formaldehyde resins which have been at least partially alkylated and at least partially methylolated.

12. The method of claim 9 wherein the polymer (1) is obtained by suitable reaction of a poly-hydroxyalkyl carbamate compound having the formula

wherein each R is independently H, a $C_1$ or $C_2$ aliphatic alkyl moiety, and $R_1$ is a $C_2$ to $C_{12}$ alkyl moiety optionally containing one or more ether groups, or a $C_6$ to $C_{15}$ cycloaliphatic, alkyl aromatic or heterocyclic moiety.

13. The method of claim 12 wherein each R is independently H or $CH_3$ and $R_1$ is a $C_2$ to $C_6$ aliphatic moiety, or a $C_8$ to $C_{15}$ cycloaliphatic moiety.

14. The method of claim 9 wherein the poly-hydroxyalkyl carbamate compound is selected from the class consisting of hexamethylene bis(hydroxypropyl) carbamate and hexamethylene bis(hydroxyethyl) carbamate.

15. The method of claim 9 wherein the acid catalyst (c) is present.

16. The method of claim 9 wherein the solvent (d) is present.

17. The method of claim 9 including heating the applied composition at a temperature of from about 200° to about 400° F. (about 93° to 204° C.).

* * * * *